United States Patent
Tremaine

(10) Patent No.: US 6,975,787 B2
(45) Date of Patent: Dec. 13, 2005

(54) NON-LINEAR METHOD FOR MICRO-MIRROR CONTROL

(75) Inventor: Brian Tremaine, San Jose, CA (US)

(73) Assignee: Nortel Networks Limited, St. Laurent (CA)

( * ) Notice: Subject to any disclaimer, the term of this patent is extended or adjusted under 35 U.S.C. 154(b) by 179 days.

(21) Appl. No.: 10/289,717

(22) Filed: Nov. 7, 2002

(65) Prior Publication Data
US 2003/0185496 A1 Oct. 2, 2003

Related U.S. Application Data

(60) Provisional application No. 60/368,212, filed on Mar. 27, 2002.

(51) Int. Cl.[7] ............................................... G02B 6/26
(52) U.S. Cl. ........................ 385/18; 385/19; 385/25; 359/212; 359/223
(58) Field of Search ................ 385/15, 16, 17, 385/18, 19, 25, 47; 359/212, 223, 224

(56) References Cited

U.S. PATENT DOCUMENTS 5,835,251 A * 11/1998 Toda et al. ................. 359/198
6,396,976 B1 5/2002 Little et al.
6,480,645 B1 * 11/2002 Peale et al. ................. 385/18
6,714,338 B2 * 3/2004 Oettinger et al. ........... 359/291
2003/0094914 A1 * 5/2003 Yanagita et al. ............ 318/560

OTHER PUBLICATIONS

Toshiyoshi et al., Linearization and Analysis of Electrostatically Actuated MEMS 2D Optical Scanner, Hilton Head 2000, Solid-State Sensor and Actuator Workshop, Jun. 5.

* cited by examiner

Primary Examiner—Sung Pak
(74) Attorney, Agent, or Firm—Guerin & Rodriguez, LLP; William G. Guerin

(57) ABSTRACT

Described is a method for controlling the angular position of a mirror. The method includes sensing the angular position of the mirror, generating a first linear control signal in response to the angular position and generating a first non-linear control signal to position the mirror. The method can also include generating a second linear control signal in response to the angular position and generating a second non-linear control signal to position the mirror. Generation of the linear control signal is based on conventional linear systems techniques. The method can be applied to mirror arrays in which the generation of the non-linear control signal is adapted for mirror performance variations.

13 Claims, 7 Drawing Sheets

NON-LINEAR METHOD FOR MICRO-MIRROR CONTROL

CROSS-REFERENCE TO RELATED APPLICATIONS

This application claims the benefit of the filing date of U.S. provisional patent application Ser. No. 60/368,212, filed Mar. 27, 2002, now abandoned, titled "Non Linear Technique for Large Angle Micro-Mirror Control", the entirety of which provisional application is incorporated by reference herein.

FIELD OF THE INVENTION

The invention relates generally to electrostatic mirror arrays used in optical switches and optical networks. More particularly, the invention relates to a method of stabilizing a position control system for an electrostatic mirror.

BACKGROUND

Electrostatic micro-mirror arrays are becoming more attractive for use in optical communication networks. For example, they can be used in optical switching to actively route optical signals between input and output channels. The overall performance of the optical switch is determined, in part, by the performance of the micro-mirror arrays. At large deflection angles, an array mirror can be unstable, that is, the mirrors cannot be accurately maintained at the desired angle of deflection.

Mirror instabilities are typically reduced using a sensor based feedback system. For two-axis systems, substantial interactions between the rotation axes often occur. Consequently, when using a linear or quasi-linear control system, instabilities are apparent if the mirror is deflected through a large angle on each axis. Thus the mirror is restricted to applications requiring only a limited range of rotation. For systems utilizing such mirrors, other system design parameters can be adjusted to accommodate the limited range. Unfortunately, the result is often a larger package size or reduced system performance.

SUMMARY

In one aspect, the invention features a method for controlling the angular position of a mirror. The angular position of the mirror is sensed and a first linear control signal is generated in response to the angular position. A first non-linear control signal is generated to control the angular position of the mirror. The first non-linear control signal is responsive to the linear control signal.

In another aspect, the invention features a system for controlling the angular position of a mirror. The system includes a linear control module for generating a linear control signal in response to the angular position. The system also includes a non-linear mapping module that converts the linear control signal into a non-linear control signal for angularly positioning the mirror. In one embodiment, the system includes a position sensor for determining the angular position of the mirror about at least one axis. In another embodiment, the system includes a coefficient adaptation module in communication with the non-linear mapping module.

In another aspect, the invention features a method for adapting a non-linear mirror control system for a mirror. A linear control value is determined for each of three angular positions. Quadratic coefficients are determined in response to the three angular positions and the three linear control values. An extrapolated linear control value based on the quadratic coefficient is determined and an adapted coefficient is calculated in response to the extrapolated linear control value.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Various feedback systems are used to control two-axis electrostatic mirrors. These feedback systems, however, are unable to eliminate mirror instabilities at large deflection angles due to interactions, or coupling, between the two axes of rotation. The present invention relates to a method and system for controlling mirrors that reduces or substantially eliminates this instability.

In brief overview, the present invention provides for controlling the angular position of a mirror. Because of the inherent non-linearities exhibited by the mirror at large deflection angles, linear control methods limit the useful angular range of operation. According to the present invention, a control parameter which linearizes a control system is determined. Conventional control modules implementing linear control methods, such as proportional-integral-derivative (PID) control or state space control are implemented with the control parameter. However, instead of directly controlling the mirror with the output signal provided by the linear control module, the output signal is used to determine a non-linear control signal. The non-linear control signal is then applied directly to the mirror system to control the angular position of the mirror. As a result, the mirror can be operated over a wider range of deflection angles.

Figure 1:
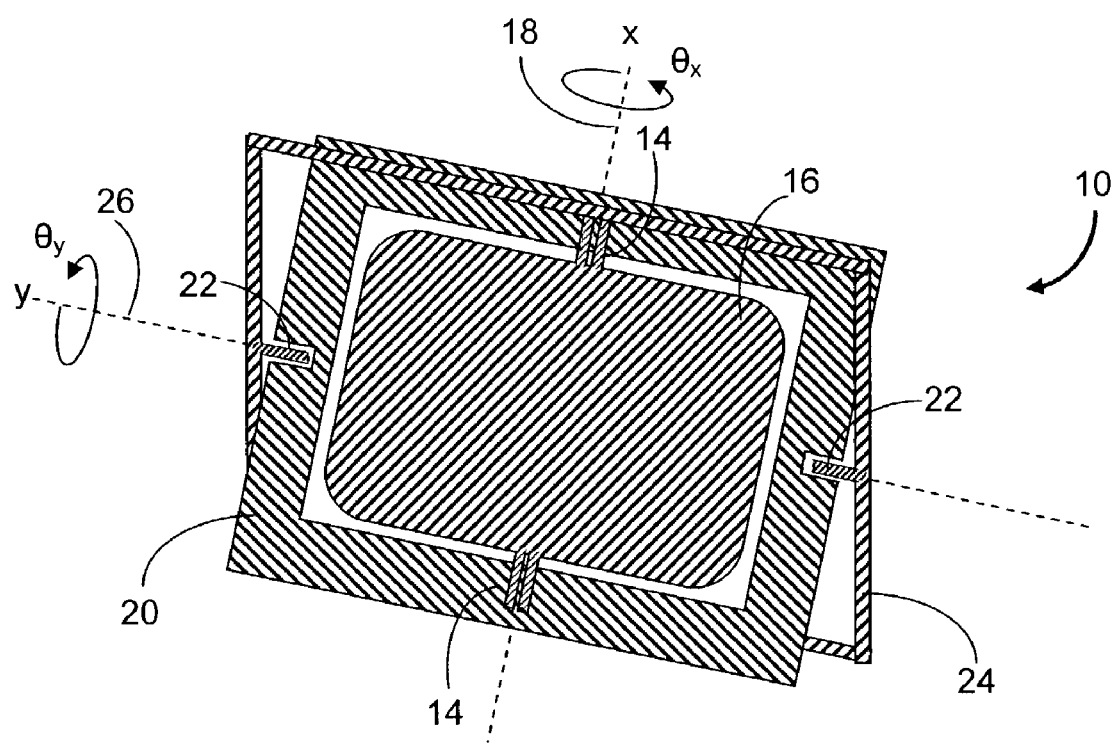
FIG. 1 is an illustration of a prior art micro-mirror having two axes of rotation.

Referring to FIG. 1, an electrostatic two-axis (i.e., 2D) scan mirror 10 includes an inner pair of hinges 14 supported by an inner frame 20 that permit rotation of a reflective surface 16 about the x-axis 18. The mirror 10 also includes an outer pair of hinges 22 supported by outer frame 24 for rotation of the reflective surface 16 and inner frame 20 about the y-axis 26. The mirror 10 represents one of a plurality of mirrors in a micro-mirror array and lies adjacent to and parallel to a set of electrode plates (not shown) on an underlying substrate. For each mirror 10, there are typically four electrode plates arranged in quadrants according to the projection of the x-axis 18 and y-axis 26 onto the plane of the electrode plates.

The angular position of the mirror 10 is determined according to the differences between the voltages of the electrode plates. For example, to position the mirror 10 at a new angle about the x-axis 18, the voltage applied to the two electrodes on one side of the x-axis 18 is increased above a bias voltage by a fixed value and the voltage applied to the electrodes on the other side of the x-axis 18 is decreased by approximately the same value. Consequently, the spatial variation in the electric field established between the electrodes and the mirror 10 causes the mirror 10 to rotate about the x-axis 18 to the new position. Similarly, to rotate the mirror 10 about the y-axis 26, the voltage applied to the electrodes on one side of the y-axis 26 is increased by a certain value and the voltage applied to the electrodes on the opposite side of the y-axis is decreased by the same value.

The dynamics of the electrostatic mirror 10 are described by the following equations:

$$\frac{dx_1}{dt} = x_2 \qquad (1a)$$

$$\frac{dx_2}{dt} = -\frac{k_{vx}}{J_x} \cdot x_2 - \frac{k_{sx}}{J_x} \cdot x_1 + \frac{f_x(x_1, y_1, u_x)}{J_x} \qquad (1b)$$

$$\frac{dy_1}{dt} = y_2 \qquad (1c)$$

$$\frac{dy_2}{dt} = -\frac{k_{vy}}{J_y} \cdot y_2 - \frac{k_{sy}}{J_y} \cdot y_1 + \frac{f_y(y_1, u_y)}{J_y} \qquad (1d)$$

in which $x_1$ and $x_2$ are the x-axis radian position and x-axis angular velocity, respectively, and $y_1$ and $y_2$ are the y-axis radian position and y-axis angular velocity, respectively. $J_x$ and $J_y$ represent the mirror moments of inertia about the x-axis 18 and y-axis 26, respectively, and $k_{vx}$, $k_{sx}$, $k_{vy}$ and $k_{sy}$ represent the velocity and position force constants for the x-axis 18 and y-axis 26, respectively, $u_x$ and $u_y$ are the control voltage signals applied to the electrodes to position the mirror 10 about the x-axis 18 and y-axis 26, respectively. The function $f_x(x_1, y_1, u_x)$ represents the electrostatic torque for the mirror 10 about the x-axis 18 and includes the coupling effect from the y-axis 26 to the x-axis 18. The function $f_y(y_1, u_y)$ represents the electrostatic torque for the mirror 10 about the y-axis 26 and does not include any coupling effect from the x-axis 18 because this interaction is generally small and therefore is ignored.

Figure 2:
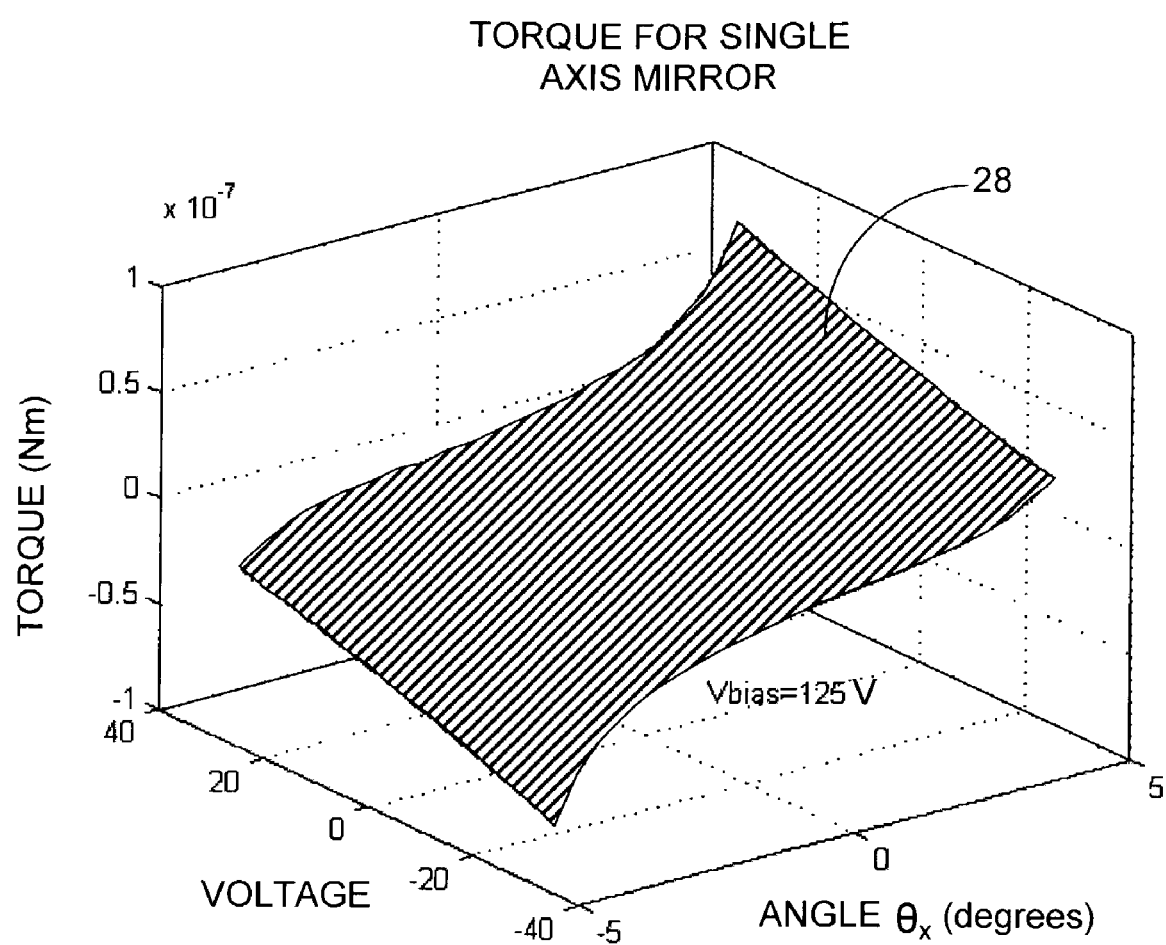
FIG. 2 is a plot of electrostatic torque as a function of rotation angle and an applied control voltage for a two axis mirror with the angular position defined about one axis held constant.

FIG. 2 shows an example of the mirror torque as a function of the deflection angle θ and the control voltage u for the electrostatic mirror 10. In this example, the mirror 10 is fixed such that no rotation is possible about the y-axis 26.

The angle $\theta_x$ axis represents the angular position of the mirror 10 about the x-axis 18 in degrees and the voltage axis represents the voltage of the control signal $u_x$ used to drive the mirror in rotation about the x-axis 18. The torque axis represents the torque applied to the mirror 10 to maintain its angular position $\theta_x$. As evident by the electrostatic torque "surface" 28, the torque increases rapidly in a non-linear manner beyond approximately ±2°.

Prior art control methods implementing linear systems with constant gains are stable only in the region in which the torque relationship is substantially planar. Consequently, for the illustrated relationship, the range of rotation for each axis for such prior art control systems is typically limited to approximately ±2°.

The response of the mirror 10 to the non-linear control signal $u_x$ (or $u_y$) depends in part on the separation of the mirror 10 from its driving electrodes and the residual tilt angle defined between the mirror 10 and the underlying substrate. For micro-mirror arrays, structural variations in the individual mirrors resulting from the fabrication process are common, therefore, it is desirable to adapt, or tune, each mirror independently. The adaptation method of the present invention accounts for the variances in each mirror to thereby extend the rotation range of each mirror beyond what is generally achievable by treating all the mirrors identically. Moreover, because the response of each mirror is typically dependent on the polarity (i.e., sign) of the rotation about each axis, it is advantageous to apply the adaptation method to each angular quadrant of operation for each mirror.

For simplicity, the nonlinear control system and method described below are generally described with respect to the x-axis 18. It should be understood by those of ordinary skill that the principles of the present invention also apply to rotation about the y-axis 26.

Referring again to FIG. 1, the mirror 10 is hinged along its centerline and rotates in angle $\theta_x$ about the x-axis 18. As previously described, the mirror 10 has two pairs of electrode plates driven in opposition. The mirror torque is given approximately by $$f(x_1, y_1, u) \equiv T = \qquad (2)$$

$$Kt \cdot \left[ \frac{(V+u)^2}{(d_o - L_x \cdot x - L_y \cdot |x \cdot y|)^2} - \frac{(V-u)^2}{(d_o + L_x \cdot x - L_y \cdot |x \cdot y|)^2} \right]$$

in which T is the torque on the mirror 10, Kt is a proportionality constant, V is the mirror bias voltage and u is the control signal voltage which is applied in opposite polarity to the pairs of electrode plates. Variables x and y are the angular positions in radians about the x-axis 18 and y-axis 26, respectively, $d_o$ is the gap, or separation, between the electrodes and the mirror 10 when the voltage control signal u is zero. $L_x$ and $L_y$ are the influence coefficients that describe how the gap $d_o$ varies when the mirror 10 is rotated about the x-axis 18 and y-axis 26, respectively. In the illustrated embodiment, the influence coefficients $L_x$ and $L_y$ are approximately $2d_o/L$ and $2d_o/W$, respectively where L is the length of the mirror 10 along the y-axis 26 and W is the length of the mirror 10 along the x-axis 18. The mirror system dynamics are described by the following non-linear equation using equations (1a through 1d) and equation (2):

$$J_x \cdot \ddot{x} + k_{vx} \cdot \dot{x} + k_{sx} \cdot x = \qquad (3)$$

$$Kt \cdot \left[ \frac{(V+u)^2}{(d_o - L_e \cdot x - L_y \cdot |x \cdot y|)^2} - \frac{(\dot{V}-u)^2}{(d_o + L_e \cdot x - L_y \cdot |x \cdot y|)^2} \right]$$

in which $\ddot{x}$ and $\dot{x}$ are the angular acceleration and angular velocity, respectively, about the x-axis 18. The mirror system described by equation (3) is "input-linearized" using the following substitution:

$$k_g \cdot \xi \equiv f(x_1, y_1, u) \cdot \frac{d_o^2}{K_t} \quad (4)$$

in which $\xi$ is a linear control variable in the linearized input space that is proportional to the computed torque and $k_g$ is a proportional gain constant. By substitution, equation (3) can now be expressed as a linear equation in the linearized input space as:

$$J_x \cdot \ddot{x} + k_{vx} \cdot \dot{x} + k_{sx} \cdot x = k_g \cdot \xi \cdot \frac{K_t}{d_o^2} \quad (5)$$

Thus, the mapping of the control variable $\xi$ to the angular position x (or y) of the mirror 10 is linear. The linear control variable $\xi$ is calculated using any linear systems technique. For example, the linear control module (i.e., the system controller) can implement methods such as PID, state estimation or discrete sliding mode control to generate the linear control variable $\xi$. In an exemplary embodiment using PID, the linear control module receives an error signal $\epsilon$ that represents the difference between a target angle value and an actual sensed angle value x (or y). Thus, $\xi$ includes a component that is proportional to the error signal $\epsilon$, a component that is proportional to the derivative of the error signal $\epsilon$ and a component that is proportional to the integral of the error signal $\epsilon$.

The output control voltage u provided to the system for stable operation is determined from the following normalized equation derived from equations (3) and (5)

$$\xi = \left[ \frac{(V+u)^2}{(1-k_x \cdot x - k_{xy} \cdot |x \cdot y|)^2} - \frac{(V-u)^2}{(1+k_x \cdot x - k_{xy} \cdot |x \cdot y|)^2} \right] \quad (6)$$

in which the coefficients $k_x$ and $k_{xy}$ are the influence coefficients $L_e$ and $L_y$ described above divided by the gap $d_o$. The control voltage u is calculated each time the mirror position is determined (i.e., sampled) and used to maintain the desired angular position until the next sampling is completed.

Figure 3:
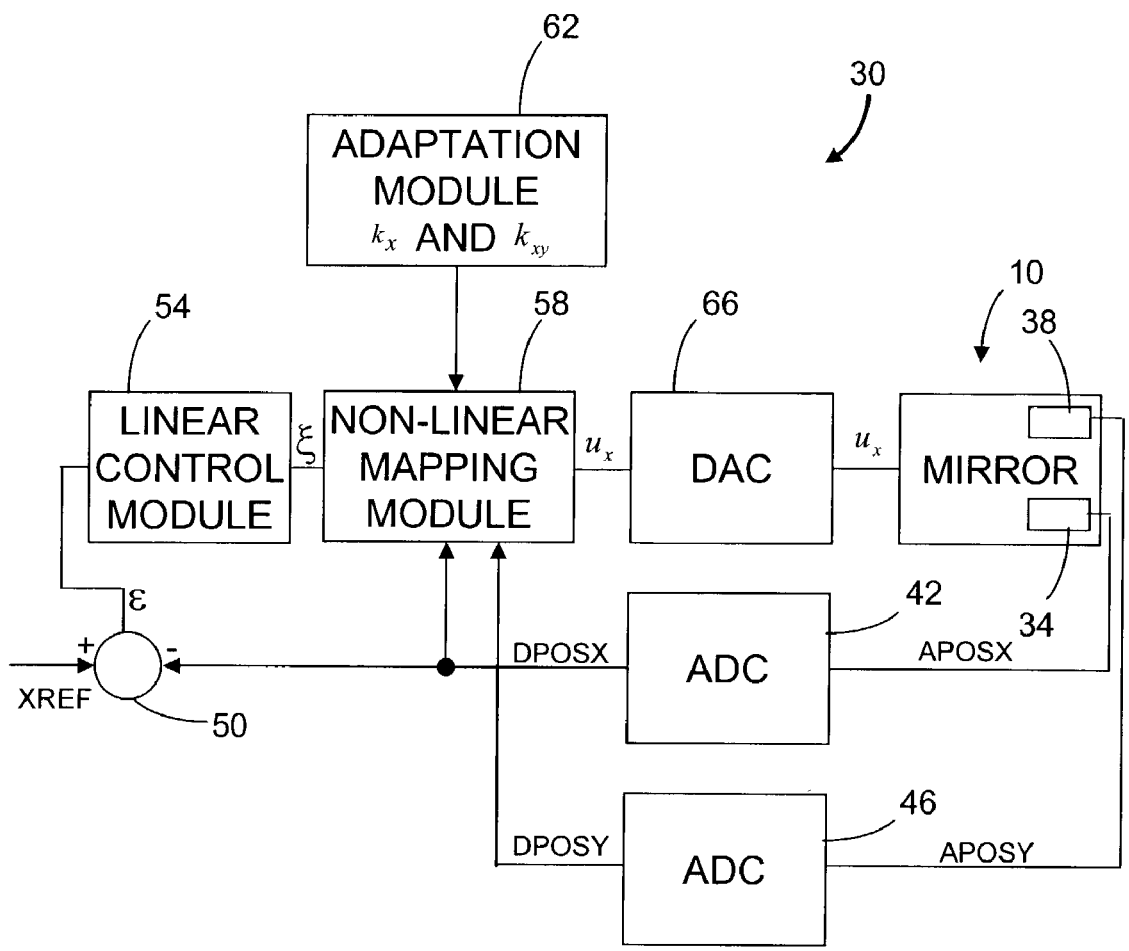
FIG. 3 is a block diagram of an embodiment of a mirror control system used to control one axis according to the present invention.

FIG. 3 is a block diagram of a mirror control system 30 for controlling positioning of the mirror 10 about the x-axis 18 (FIG. 1). The control system 30 includes a pair of angular position sensors 34 and 38 in communication with a pair of analog-to-digital converters (ADCs) 42, 46, respectively, and a differencing element 50 in communication with the x-axis ADC 42.

The control system 30 also includes a linear control module 54 in communication with the differencing element 50, a non-linear mapping module 58 in communication with the ADCs 42, 46 and the linear control module 54, an adaptation module 62 in communication with the non-linear mapping module 58, and a digital-to-analog converter (DAC) 66 in communication with the non-linear mapping module 58 and the mirror 10'. A flowchart representation for a method of controlling the angular position of the mirror 10' using the control system 30 of FIG. 3 is shown in FIG. 4.

Figure 4:
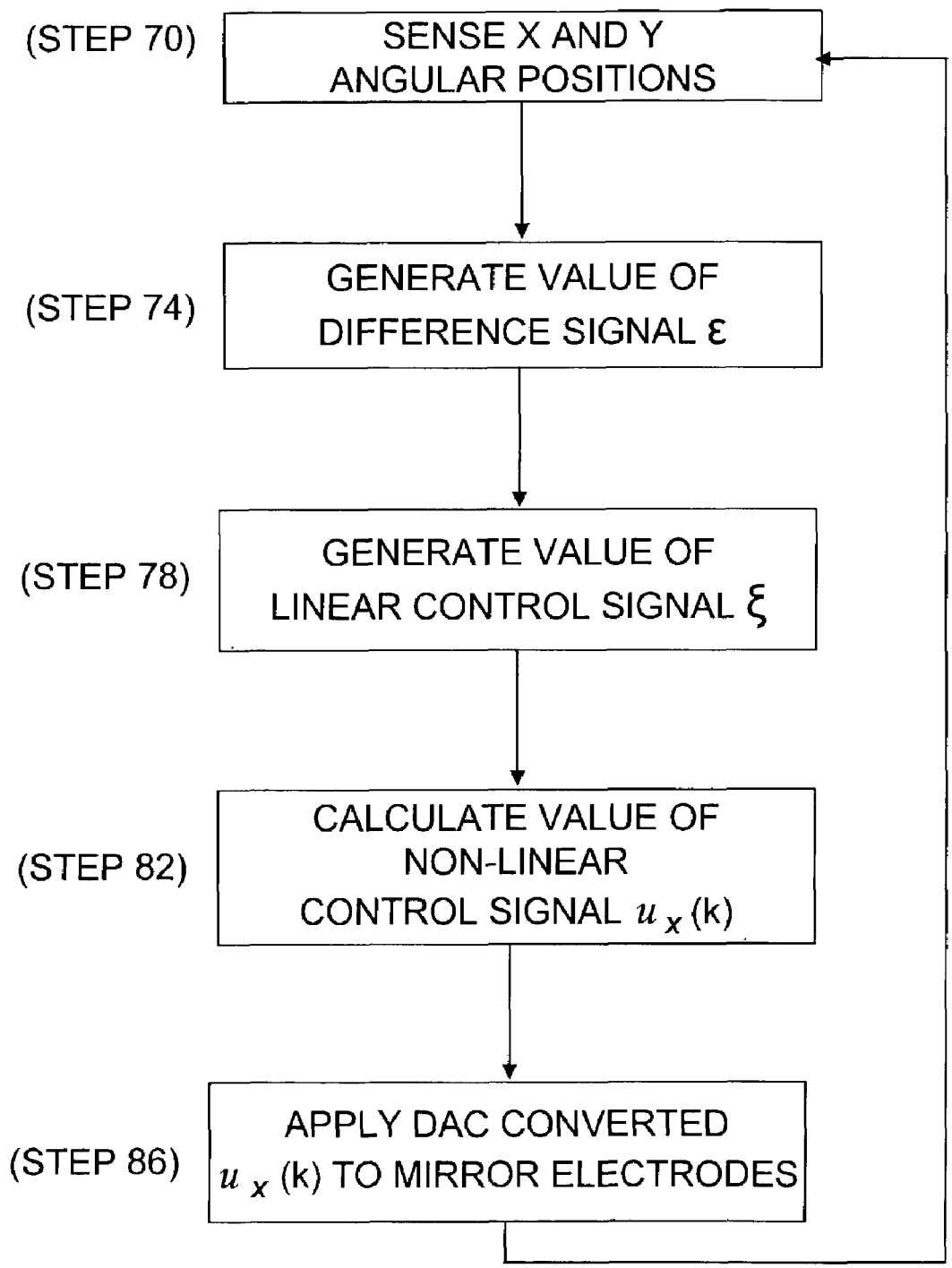
FIG. 4 is a flowchart representation of an embodiment of a method for controlling the angular position of a mirror according to the present invention.

Referring to both FIGS. 3 and 4, the pair of angular sensors (e.g., piezoresistive sensors) 34, 38 are used to sense (step 70) the angular positions of the mirror 10 about the x-axis 18 and y-axis 26, respectively. The sensors 34, 38 generate analog signals APOSX and APOSY having a value indicative of the current angular positions x and y of the mirror 10. The analog signals APOSX, APOSY are converted to digital signals DPOSX and DPOSY by ADCs 42 and 46, respectively. A difference signal $\epsilon$, representative of the difference between the digital position DPOSX for the x-axis 18 and a reference signal XREF indicating the desired angular position (i.e., reference position), is generated (step 74) by the differencing element 50.

The linear control module 34 generates (step 78) a linear control signal $\xi$ having a value responsive to the difference signal $\epsilon$. The non-linear mapping module 38 then determines (step 82) the appropriate value of the non-linear control signal u according to equation (6). In one embodiment, the non-linear mapping module 38 is a digital signal processor (DSP). Coefficients $k_x$ and $k_y$ corresponding to the given mirror 10 are provided by the adaptation module 62 to the non-linear mapping module 58. The function of the adaptation module 62 is described in more detail below. The non-linear control signal u is converted to an analog voltage signal by the DAC 66 and applied (i.e., added or subtracted) (step 86) to the bias voltage of the electrodes.

This process of sensing angular position, generating the difference signal $\epsilon$, generating the linear control signal $\xi$ and determining the non-linear control signal u is repeated each time the mirror angular position is sampled. The sampling frequency is typically determined according to the specific requirements of the application employing the mirror system.

In one embodiment, the control voltage u is determined for each sample period by calculating the following variables:

$$g_1 = (1 - k_x \cdot x - k_{xy} \cdot |x \cdot y|)^2$$

$$g_2 = -(1 + k_x \cdot x - k_{xy} \cdot |x \cdot y|)^2$$

$$c_0 = V^2 \cdot (g_1 + g_2) - \xi \cdot g_1 \cdot g_2$$

$$c_1 = 2 \cdot V(g_1 + g_2)$$

$$c_2 = (g_1 + g_2) \quad (7a)$$

The control voltage u is then determined by solving the following equation:

$$c_o + c_1 \cdot u + c_2 \cdot u^2 = 0 \quad (7b)$$

As previously described, the performance of individual mirrors 10 in a micro-mirror array can differ due to variations in the mirror structures. For example, the separation $d_0$ of each mirror 10 from the substrate typically varies slightly between mirrors, and particularly between micro-mirror arrays. Furthermore, the coefficients $k_x$, $k_{xy}$ and $k_y$ vary at large angles because the actual gap between the mirror 10 and the substrate becomes small compared to $d_o$. In addition, any offset tilt for mirrors at rest and/or variations in the sensitivity of the angular position sensors 34, 38 affect $k_x$, $k_{xy}$ and $k_y$. If not addressed, these variations have a significant impact on the stability of the mirror system 30 and, therefore, the control parameters. In order to expand the useful range of angular motion, the coefficients $k_x$, $k_{xy}$ and $k_y$ are adaptively determined.

Figure 5:
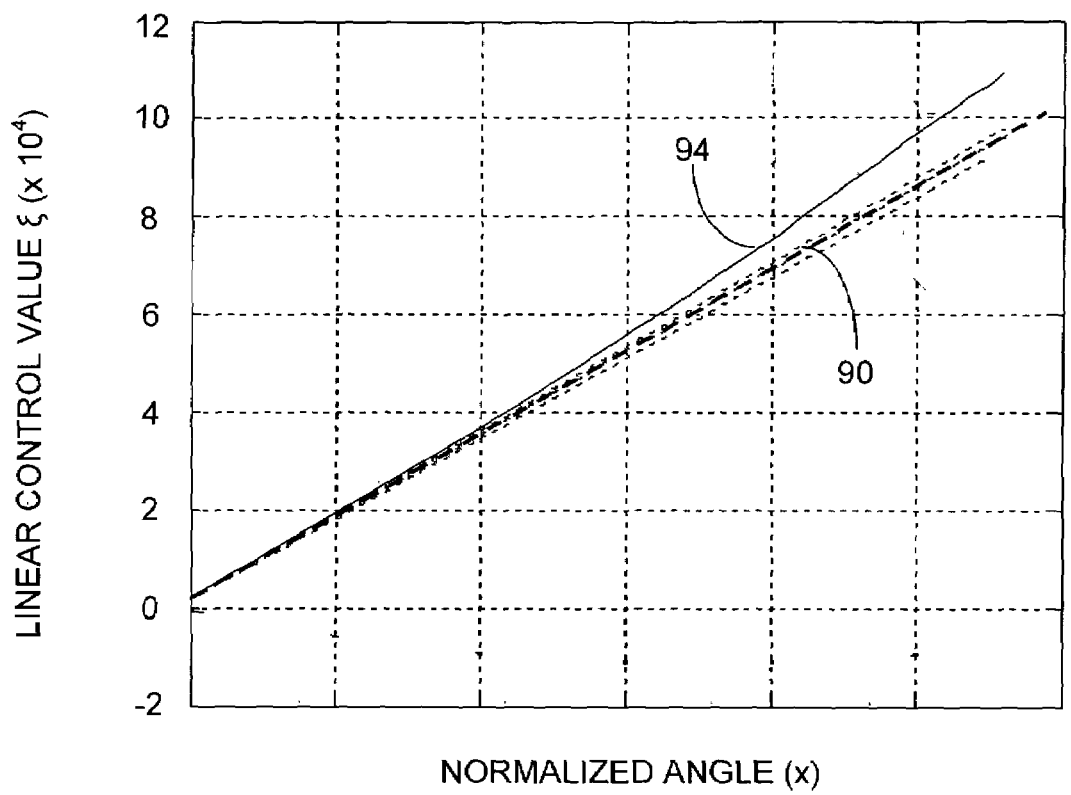
FIG. 5 is a plot of the linear control value $\xi$ as a function of normalized angle before and after application of an embodiment of an adaptation method of the present invention.

Referring to FIG. 5, the control signal $\xi$ is plotted as a function (dashed line 90) that is linear with angle x. However, due to the variations in the mirror structures, the functional relationship between the control signal ξ and the angular position x for an individual mirror 10 in a micromirror array is more generally described by a curve that turns either upward (e.g., solid line 94) or downward as x increases. In accordance with the present invention, a calibration, or adaptation procedure, is implemented wherein the coefficients $k_x$ and $k_{xy}$ are tuned, or adapted, for each mirror 10 so that the control signal ξ is substantially linear with angle x.

Figure 6:
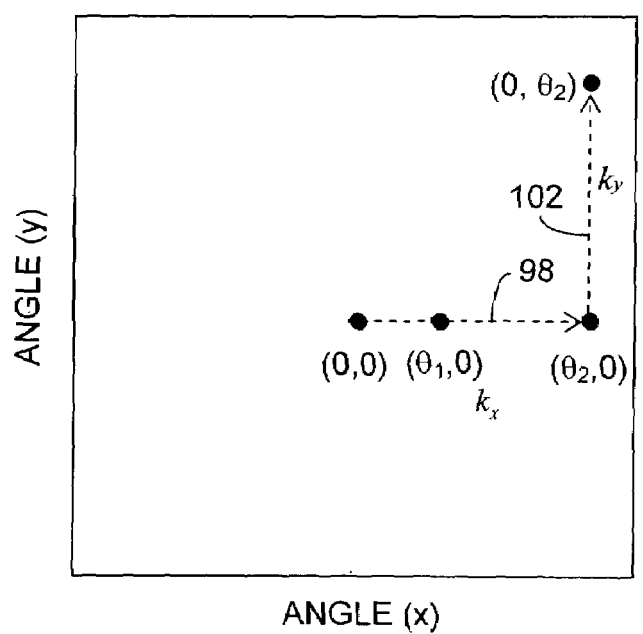
FIG. 6 is a plot of the angular positioning of the mirror during an embodiment of the adaptation process of the present invention.

The adaptation procedure for the coefficient $k_x$ includes determining the initial control signal ξ for each of three angular positions: x=0, x=θ$_1$ and x=θ$_2$ as shown by line 98 in FIG. 6. The resulting three points are fit to a quadratic equation $$a_0 a_1 \cdot x + a_2 \cdot x^2 = \xi \quad (8)$$

Figure 7A:
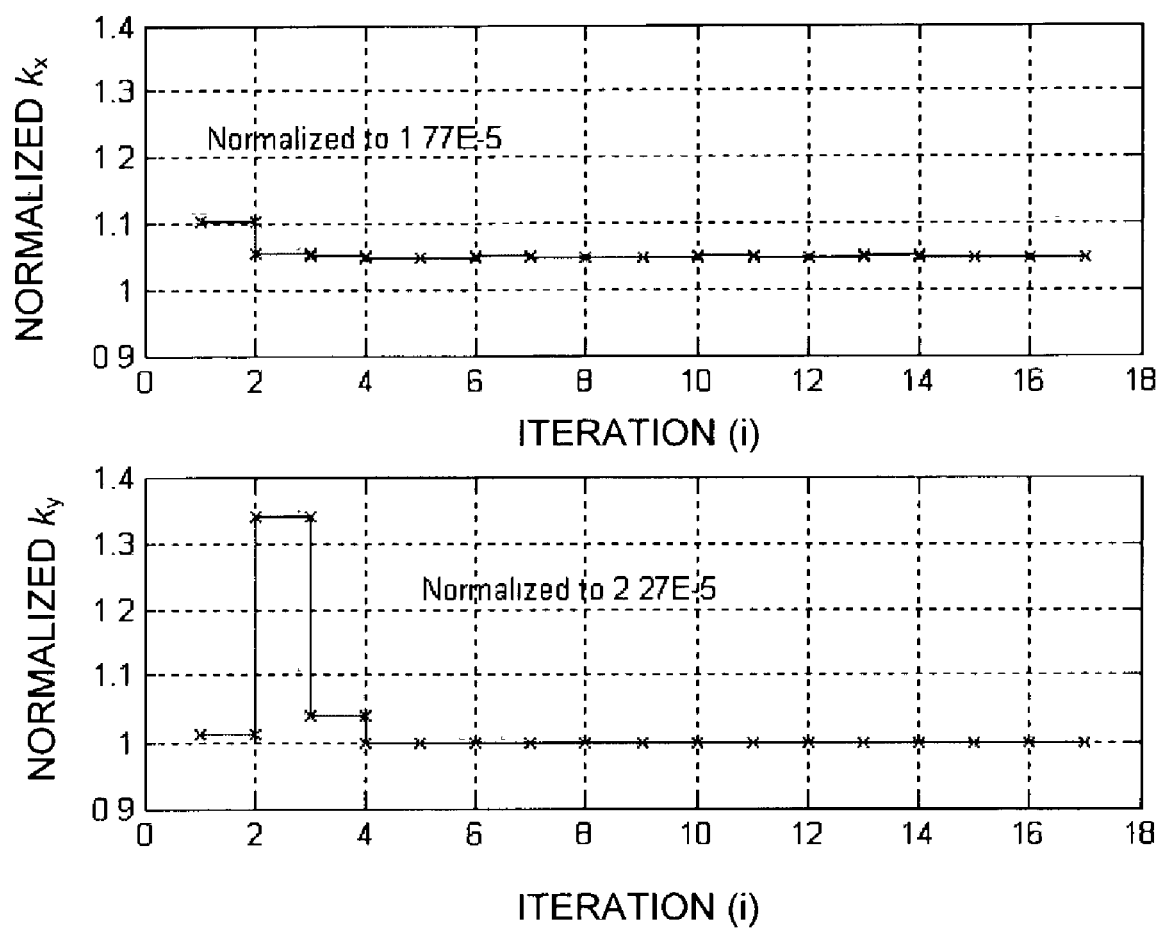
FIGS. 7A and 7B are plots of the values of $k_x$, $k_y$ and $k_{xy}$ during an embodiment of an adaptation process of the present invention.

Because a linear dependence is expected, the coefficients $a_0$ and $a_1$ resulting from the fit to equation (8) are then used to extrapolate the value of ξ at x=θ$_2$ from the linear relationship ξ$_0$=$a_0$+$a_1$ θ$_2$. While the mirror is rotated to a position at x=θ$_2$, the coefficient $k_x$ is adapted as follows:

$$k_x(i+1) = k_x(i) + \sigma \cdot \frac{(\xi_0 - \xi)}{|\xi_0|} \quad (9)$$

in which σ is the adaptation parameter used in the relaxation. Thus, as the mirror is driven from x=0 to x=θ$_2$, the value of the coefficient $k_x$ (i.e., $k_x$(i+1)) is repeatedly calculated from a previously calculated value (i.e., $k_x$(i)) and the current control parameter value ξ using equation (9). The adaptation of $k_x$ continues until the relationship between the control parameter and angle x is sufficiently linear. In one embodiment, the adaptation parameter σ is a fixed design constant and the calculation is repeated until a predetermined number of iterations is reached. In another embodiment, calculations continue until the difference $k_x$(i+1)−$k_x$(i) is less than a predetermined error value. The coefficient $k_y$ is adapted in the same manner as the adaptation of the coefficient $k_x$. An example adaptation of coefficient $k_x$ and coefficient $k_y$ is shown in FIG. 7A in which the horizontal axis represents the iteration number (i) of the calculation of coefficient $k_x$ and the vertical axis is the normalized value of $k_x$ or $k_y$.

Figure 7B:
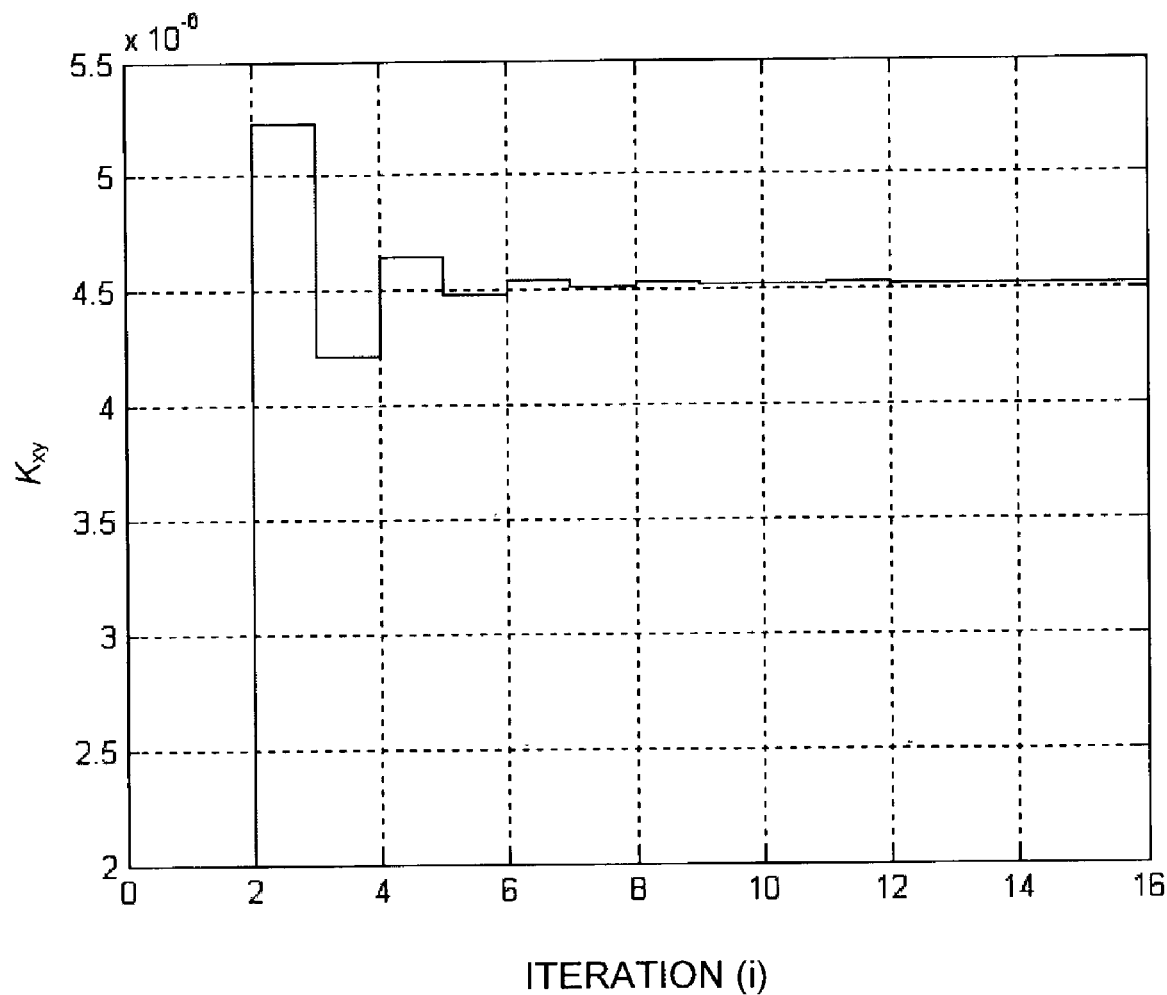

To adapt the coefficient $k_{xy}$, the value of the control parameter ξ is determined at (x=θ$_2$, y=0). The mirror is then positioned at (x=θ$_2$, y=θ$_2$) (See line 102 of FIG. 6) If there is no coupling, the value of control parameter ξ remains at ξ$_0$. While the mirror is rotated to (x=θ$_2$, y=θ$_2$) the coefficient $k_{xy}$ is adapted as follows:

$$k_{xy}(i+1) = k_{xy}(i) + \sigma \cdot \frac{(\xi_0 - \xi)}{|\xi_0|} \quad (10)$$

in the same manner as described for the determination of the coefficient $k_x$ above. An example adaptation of coefficient $k_{xy}$ is shown in FIG. 7B in which the horizontal axis represents the iteration number (i) of the calculation of coefficient $k_{xy}$ and the vertical axis is the value of $k_{xy}$. A different coefficient $k_{xy}$ can be adapted for each "corner" of the mirror angular range using this same procedure. This is particularly useful if the mirror 10, in its nominal at rest position, has a tilt with respect to the substrate, thus changing the effective separation $d_o$.

The actual measurement of $k_x$ and $k_y$ can be interpreted as providing a more accurate value of the estimated gap $d_o$. Because the torque and loop servo gain is proportional to $(1/d_o)^2$, the adapted values of the coefficients $k_x$ and $k_y$ can be used to adapt the loop gain of the control system for a given mirror 10. In particular, the loop gain can be adapted as follows using the "measured values" rather than the design values:

$$k_{gx} = k_{gx\_ref} \cdot \left(\frac{k_{x\_ref}}{k_x}\right)^2 \quad (11)$$

$$k_{gy} = k_{gy\_ref} \cdot \left(\frac{k_{y\_ref}}{k_y}\right)^2 \quad (12)$$

in which $k_{x\_ref}$ and $k_{y\_ref}$ are the original design values for $k_x$ and $k_y$, respectively, and $k_{gx\_ref}$, $k_{gy\_ref}$, $k_{gx}$ and $k_{gy}$ are the design gains and adapted loop gains, respectively, for positioning about the x-axis 18 and y-axis 26, respectively. A more consistent response is achieved for all mirrors in the array using this adaptation of the loop gain.

In some applications, it is desirable to switch the various constants of derivative and integral feedback used in the mirror servo system 30. For example, one set of constants is optimized to achieve the minimum switching time during repositioning of the mirror 10. A different set of constants is preferred when the mirror 10 has reached its equilibrium position and in a tracking or lock mode. If parasitic capacitive coupling exists between the mirror 10 and its adjacent electrodes, it is often advantageous to select constants for the linear control module 54 (FIG. 3) so that the servo system interacts quickly to overcome any transients. For example, the integrator constant can be substantially increased.

While the invention has been shown and described with reference to specific preferred embodiments, it should be understood by those skilled in the art that various changes in form and detail may be made therein without departing from the spirit and scope of the invention as defined by the following claims. The method and apparatus of the present invention apply to both single mirror and multi-mirror systems. In addition, the method of the invention can be applied to any type of mirror system having a non-linear response to an applied control signal.

What is claimed is:

1. A method for controlling an angular position of a mirror in an array of mirrors comprising:
   determining, for each mirror in the array of mirrors, a non-linear angular position response to a drive control signal;
   sensing an angular position of one of the mirrors in the array of mirrors;
   generating a first liner control signal in response to the angular position of the sensed mirror; and
   generating a first non-linear control signal responsive to the first linear control signal and a respective one of the non-linear angular position responses to control the angular position of the sensed mirror.

2. The method of claim 1 further comprising:
   generating a second linear control signal in response to the angular position of the sensed mirror; and
   generating a second non-liner control signal responsive to the second linear control signal and a respective one of the non-linear angular position responses to control the angular position of the sensed mirror.

3. The method of claim 1 further comprising positioning the sensed mirror in response to the first non-linear control signal.

4. A system for controlling an angular position of a mirror in an array of mirrors, comprising:
   a linear control module for generating a linear control signal in response to the angular position of the mirror;
   a coefficient adaptation module for storing an influence coefficient for each of the mirrors in the array; and
   a non-linear mapping module in communication with the linear control module and the coefficient adaptation module, the non-linear mapping module generating a non-linear control signal responsive to the linear control signal and a respective one of the influence coefficients to control the angular position of the mirror.

5. The system of claim 4 further comprising a position sensor for determining the angular position of the mirror about at least one axis.

6. The system of claim 4 further comprising a means for angularly positioning the mirror in response to the non-linear control signal.

7. The system of claim 6 wherein said means for angularly positioning the mirror comprises an electrostatic positioner.

8. The system of claim 4 further comprising a digital-to-analog converter in communication with the non-linear mapping module.

9. A method for adapting a non-linear mirror control system for a mirror having a nonlinear angular position response to a drive control signal, comprising:
   determining a linear control value for each of three angular positions;
   determining quadratic coefficients in response to the three angular positions and the three linear control values;
   determining an extrapolated linear control value based on the quadratic coefficients; and
   calculating an adapted coefficient in response to the extrapolated linear control value.

10. The method of claim 9 wherein the step of calculating an adapted coefficient comprises:
    positioning the mirror at a known angular position; and
    determining the adapted coefficient for the mirror at the known angular position and a previously calculated adapted coefficient.

11. The method of claim 10 wherein the steps of positioning the mirror and determining the adapted coefficient are repeated until the adapted coefficient is indicative of a substantially linear variation of the control value to the angular position of the mirror.

12. The method of claim 10 wherein the known angular position is determined from a measurement of the mirror angular position.

13. The method of claim 1 wherein the determination of a non-linear angular position response for each mirror is based on at least one influence coefficient of the respective mirror.

* * * * *